2 Sheets--Sheet 1.

E. BUSSEY.

Reservoir Cooking-Stoves.

No. 5,435.

Reissued June 3, 1873.

Witnesses:
C. H. Isham
H. A. Daniels

Esek Bussey, Inventor, by
Charles S. Whitman
Attorney.

N. PETERS. Photo-Lithographer, Washington, D. C.

DRAFTSMA

126 STOVES & FURNACES,
Sub-
Division.
31

2 Sheets--Sheet 2.

E. BUSSEY.

Reservoir Cooking-Stoves.

Reissued June 3, 1873.

No. 5,435.

Witnesses:
C. H. Isham
H. A. Daniels

Esek Bussey Inventor, by
Charles S. Whitman
Attorney

AM. PHOTO-LITHOGRAPHIC CO. N.Y. (OSBORNE'S PROCESS.)

UNITED STATES PATENT OFFICE.

ESEK BUSSEY, OF TROY, NEW YORK, ASSIGNOR OF ONE-HALF INTEREST TO CHARLES A. McLEOD, OF SAME PLACE.

IMPROVEMENT IN RESERVOIR COOKING-STOVES.

Specification forming part of Letters Patent No. 51,292, dated December 5, 1865; reissue No. 2,319, dated July 24, 1866; reissue No. 5,435, dated June 3, 1873; application filed April 24, 1873.

*To all whom it may concern:*

Be it known that I, ESEK BUSSEY, of Troy, in the county of Rensselaer and State of New York, have invented certain new and useful Improvements in Cooking-Stoves; and I do hereby declare that the following is a full, clear, and exact description thereof, that will enable others skilled in the art to which it appertains to make and use the same, reference being had to the accompanying drawings, and to the letters of reference marked thereon which form a part of this specification.

This invention relates to cooking-stoves and to culinary boilers or water-reservoirs; and the nature thereof consists, first, in the extension of the top of the stove beyond the rear flues thereof, and making an opening in such extended top for the reception of a reservoir, to be placed wholly or partially below the plane of the top of the stove; second, in the arrangement of an uncased or naked reservoir at the rear of the stove, with the upper part thereof resting in the said opening in the extended top plate; third, in the removal of a portion of the back plate and the substitution therefor of the front side of a reservoir or boiler, so that the front of the reservoir will form a portion of the casing of the vertical flues of the stove, and be directly heated by the products of combustion as they pass up and down the rear flue or flues; fourth, in the arrangement of the exit-passage or smoke-pipe upon a line or the prolongation of a line passing between the reservoir and oven of a stove in which a portion of the back plate or casing of the vertical flues has been removed, as aforesaid, for the purpose of retaining heat for both the reservoir and oven that would otherwise pass off and be lost or wasted; fifth, in certain combinations of parts of the stove hereinafter fully described.

My invention will be more fully understood by reference to the accompanying plate of drawings, in which corresponding parts are illustrated by similar letters, and in which—

Figure 1:
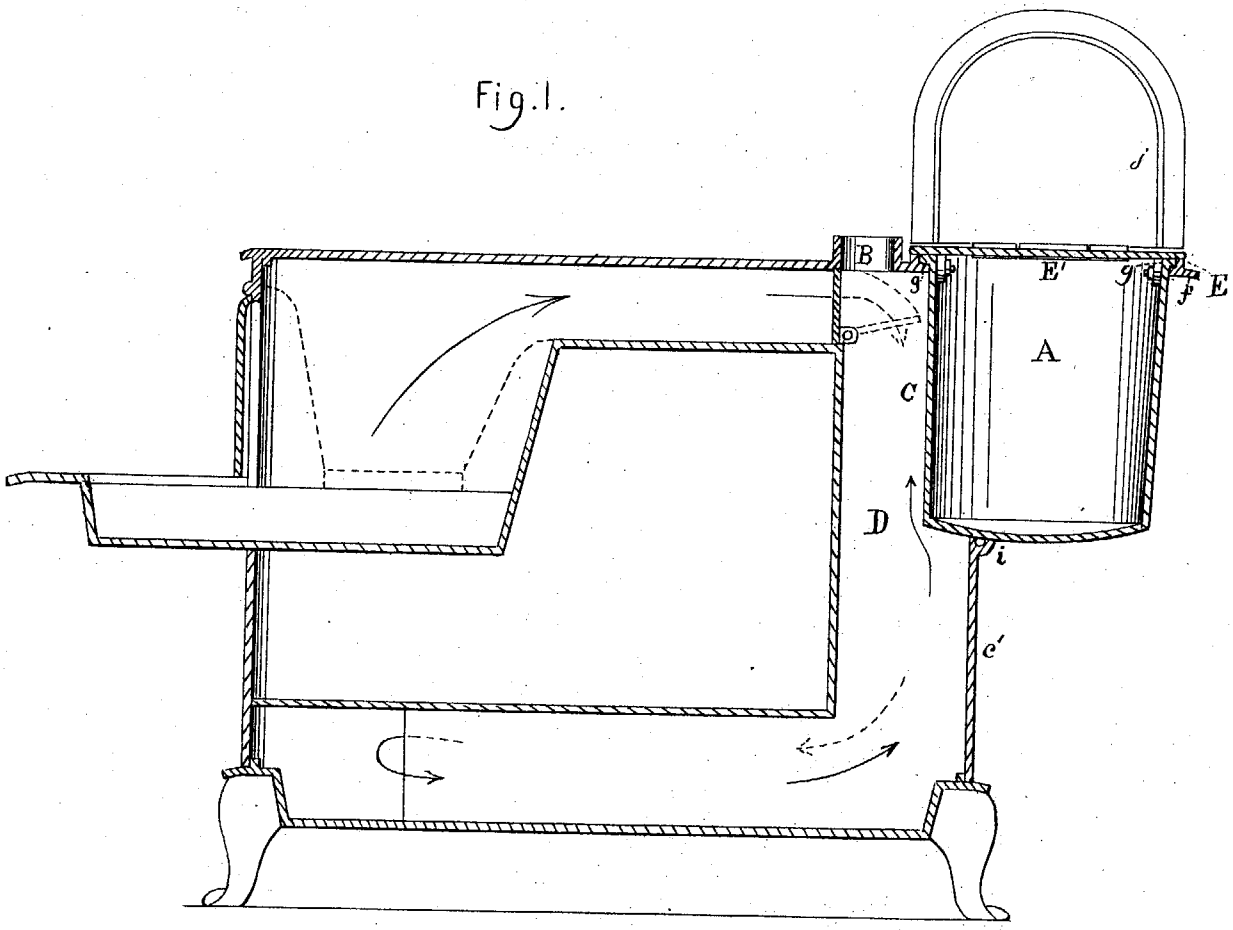
Figure 4:
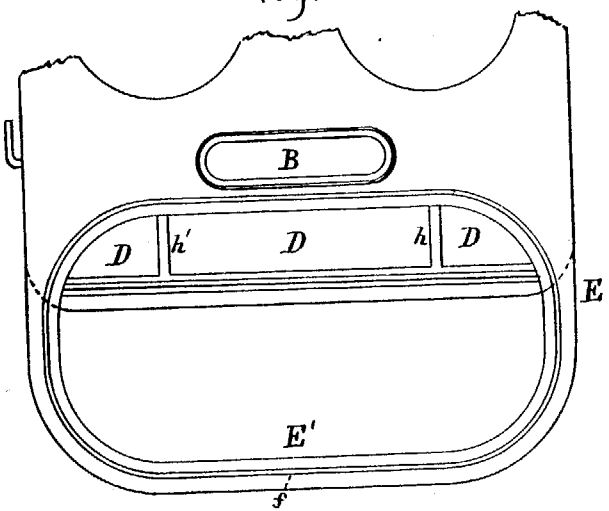
Figure 3:
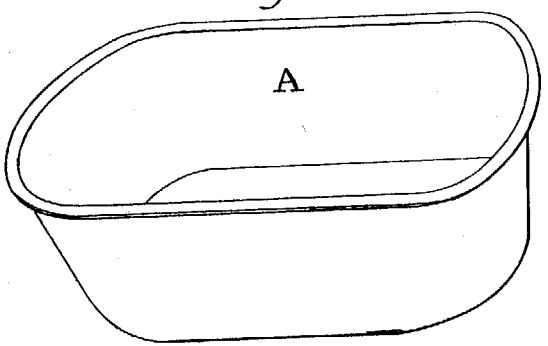
Figure 2:
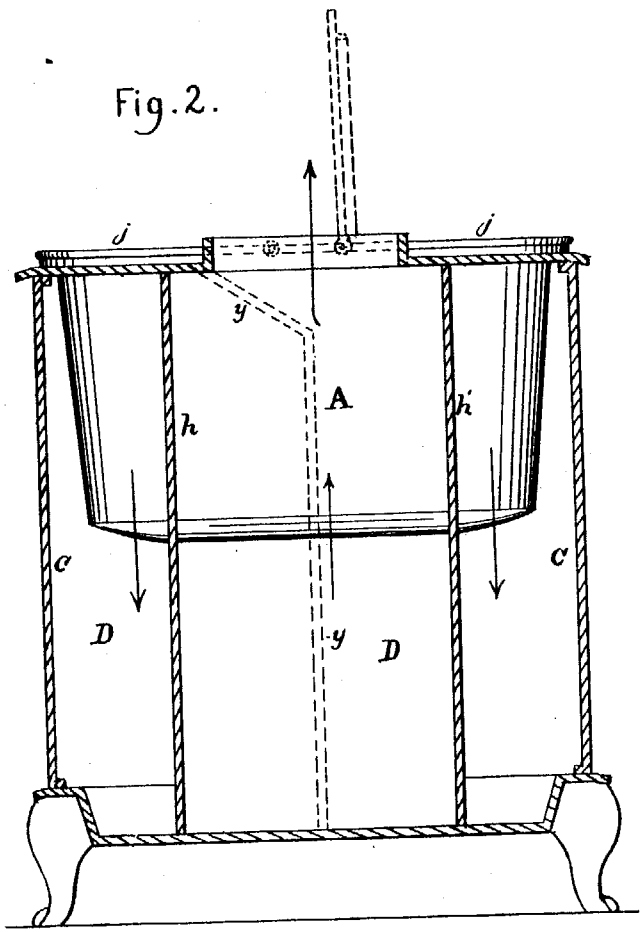

Figure 1 is a longitudinal section taken through the center of the stove in a vertical plane. Fig. 2 is a transverse section taken in a vertical plane between the oven and reservoir. Fig. 3 illustrates, in perspective, the reservoir or boiler. Fig. 4 is a view of the rear end and extended top of the stove having an opening for the reception of the reservoir.

In the drawings referred to, A designates the boiler or reservoir, constructed of any suitable material, and of such form and size as may be deemed desirable or rendered necessary by the shape of the stove to which it is applied. The form of that portion of the reservoir which is substituted for the part of the casing of the vertical flues removed will be determined by the size and configuration of the opening cut in the back plate and casing of the vertical flues for its reception, but the other parts of the reservoir may be of any size, shape, or configuration which may be preferred. B designates the exit-passage or smoke-pipe, which is arranged on a line or the prolongation of a line passing between the oven and the reservoir, in order that the heated air and products of combustion passing through the vertical flues may be thoroughly utilized and made to heat both the oven and reservoir before passing away. In a stove having three flues this arrangement of the exit-pipe causes the reservoir to receive the benefit of the heated air and products of combustion before and after the same has passed around the oven. C designates the side plates of the stove and lateral casing of the flues D. The stove in which the boiler and exit-passage are arranged as aforesaid may be constructed with two lateral descending or diving flues and a central ascending flue, as shown in full lines in the drawings, or with a descending flue on one side and ascending flue on the other side, as indicated by the dotted lines *y y*, or with a broad ascending sheet-flue or other suitable arrangement of the fire-flue or fire-flues. E designates the extension of the top plate, provided with an aperture, E, for the reception of the boiler or reservoir, which may be attached to or supported upon the extended top plate in any convenient manner. In the accompanying drawings one of the numerous methods which may be employed for combining the reservoir with the aperture in the extended top plate is illustrated—that is to say, the reservoir is provided with a flange, *g*, which rests in a recess formed about the opening E′ by the elliptical projection *f* cast or formed upon the extended top plate E. By this construction the top of the reservoir is nearly coincident with the plane of the top plate, but it is evident that a part of the boiler may be situated considerably above the top plate if it is desirable so to place it. The covers *j j* may be hinged to the reservoir, as shown in dotted lines, or secured thereto in any other convenient manner. In the drawings the reservoir is represented as resting upon the flange *i* cast upon the upper edge of the vertical end plate *c′*; but this construction may be varied in accordance with the kind of stove to which the reservoir is adapted, and the end plate *c*, instead of being vertical, may be of curvilinear form, and so constructed as to extend beneath the reservoir. The reservoir may be made to rest either wholly or partially on or against the flue-plates *h h′*, or it may be so arranged upon the rear of the stove that the front lower edge thereof shall rest upon the flange *i*.

In whatever manner the reservoir is placed it should be so secured to the rear of the stove by such proper mechanical means as to render the flues, as near as possible, air-tight.

Among the advantages possessed by a stove to which my invention has been applied may be enumerated the following: First, the hot air and products of combustion are brought in direct contact with the reservoir; second, the heat is not taken away from the flues to heat the reservoir, as the arrangement of the exit-passage or smoke-pipe between the reservoir and oven causes heat to be retained by both that would otherwise pass off or become wasted; third, the reservoir is heated perfectly, either by direct draft or when the products of combustion pass around the oven; fourth, it is not necessary to alter the leading patterns of ordinary cooking-stoves in order to attach the reservoir thereto; fifth, the reservoir is so situated as to be easily cleaned and handled, and to leave room for a warming-closet to be placed underneath the reservoir.

Having thus described my invention, I claim and desire to secure by Letters Patent—

1. The top plate of a cooking-stove extended beyond the rear flues thereof, and provided with an opening for the reception of a reservoir or boiler, as and for the purposes described.

2. The arrangement of an uncased reservoir at the rear of the stove with the upper part thereof resting in the opening in the extended top plate, as and for the purposes described.

3. The arrangement of a reservoir at the rear of a stove with its bottom resting on the back plate thereof, and its upper part above the opening in the extended top plate.

4. The arrangement of a reservoir at the rear of a stove, a portion of the back plate of which has been removed, so that the front plate of the reservoir will form a part of the back plate or outer casing of the vertical flues of the stove, as and for the purposes described.

5. The arrangement in a cooking-stove of a culinary boiler and an exit-passage for the gases of combustion, both at one end of the stove, and so that the said boiler forms a part of the lateral casing on the outer side of a fire-flue or fire-flues in the end of the stove below the said exit-passage, in the manner substantially as and for the purposes set forth.

6. The employment and arrangement of the boiler or reservoir A within and upon the rear end of a cooking-stove, and wholly or partly below the top plate thereof, so that one side of such boiler shall form and complete the lateral casing of the rear end vertical flue or flues below the top plate thereof and the bottom of said boiler, in the manner and for the purpose substantially as herein described and set forth.

7. The construction of the rear end and vertical flue or flues of a cooking-stove by means of the boiler or reservoir A and the lower vertical end or boiler-supporting plate *c*, so that the hot air or escaping products of combustion shall come into direct contact with that part or portion of such boiler next adjoining such flue or flues, so as to warm or heat the water or other material in said boiler, in the manner substantially as herein described and set forth.

8. In a stove having a portion of the rear casing of the vertical flues removed and a reservoir placed contiguous thereto, the arrangement of the exit-passage or smoke-pipe upon a vertical line or prolongation of a vertical line passing between the reservoir and the oven, as and for the purposes described.

9. In a cooking-stove having three flues and a portion of the casing of the vertical flues removed and a reservoir placed in the rear thereof, the arrangement of the exit-passage or smoke-pipe over the center ascending vertical flue.

10. In a cooking-stove having ascending and descending flues and a portion of the casing of the vertical flues removed and a reservoir placed in the rear thereof, the arrangement of the exit-passage or smoke-pipe over the vertical ascending flue and between the reservoir and oven.

11. The extension of the flue division-plates under the reservoir, as and for the purposes described.

12. A cooking-stove in which a portion of the casing of the vertical flue or flues has been removed, as and for the purposes described.

In testimony that I claim the foregoing I have hereunto set my hand and seal this 21st day of April, 1873.

ESEK BUSSEY. [L. S]

Witnesses:

J. W. ALGER,

RICHARD P. O'BRIEN.